(12) United States Patent
Chowdhury et al.

(10) Patent No.: US 11,363,531 B2
(45) Date of Patent: Jun. 14, 2022

(54) ENCODING AND DECODING DATA IN COMMUNICATION FRAMES OF A COMMUNICATIONS PROTOCOL

(71) Applicant: Northeastern University, Boston, MA (US)

(72) Inventors: Kaushik Chowdhury, Boston, MA (US); M. Yousof Naderi, Brookline, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 0 days.

(21) Appl. No.: 16/758,707

(22) PCT Filed: Oct. 26, 2018

(86) PCT No.: PCT/US2018/057748
§ 371 (c)(1),
(2) Date: Apr. 23, 2020

(87) PCT Pub. No.: WO2019/084429
PCT Pub. Date: May 2, 2019

(65) Prior Publication Data
US 2020/0344692 A1    Oct. 29, 2020

Related U.S. Application Data

(60) Provisional application No. 62/577,509, filed on Oct. 26, 2017.

(51) Int. Cl.
*H04W 52/02* (2009.01)
*H04W 56/00* (2009.01)
(Continued)

(52) U.S. Cl.
CPC ... *H04W 52/0245* (2013.01); *H04W 52/0229* (2013.01); *H04W 52/0274* (2013.01);
(Continued)

(58) Field of Classification Search
CPC .................. H04W 76/15–16; H04W 76/20–34
See application file for complete search history.

(56) References Cited

U.S. PATENT DOCUMENTS

2003/0193970 A1* 10/2003 Kim .................. H04L 27/2613
                                                                370/509
2011/0310830 A1    12/2011 Wu et al.
(Continued)

FOREIGN PATENT DOCUMENTS

EP    2827631 A1    1/2015
WO    2019/084429 A1    5/2019

OTHER PUBLICATIONS

International Search Report and Written Opinion for Int'l Application No. PCT/US2018/057748, titled: Encoding and Decoding Data in Communication Frames of a Communications Protocol, dated Jan. 29, 2019.

*Primary Examiner* — San Htun
(74) *Attorney, Agent, or Firm* — Hamilton, Brook, Smith & Reynolds, P.C.

(57) ABSTRACT

The disclosed apparatus and methods can be used to provide an energy efficient Internet of Things (IoT) communication method that can be deployed on a city-wide scale using existing infrastructure and that can target individual sensors or devices. An example apparatus is a decoder including an energy detector and a processor. The energy detector is configured to detect average subframe energy levels of a plurality of subframes during reception of at least one frame of data defined by a first communications protocol (e.g., Long-Term Evolution (LTE)). The average subframe energy levels of the plurality of subframes form a pattern of relatively higher and lower energy levels. The processor is configured to interpret, according to a second communications protocol, the pattern of energy levels to decode a block of data represented by the pattern of energy levels. Another (Continued)

embodiment is a method producing index modulation signals of the second communications protocol.

9 Claims, 12 Drawing Sheets

(51) Int. Cl.
 *G16Y 40/30* (2020.01)
 *H04W 76/20* (2018.01)
(52) U.S. Cl.
 CPC ........... *H04W 56/001* (2013.01); *G16Y 40/30* (2020.01); *H04W 76/20* (2018.02)

(56) References Cited

U.S. PATENT DOCUMENTS

| | | | |
|---|---|---|---|
| 2012/0106420 A1* | 5/2012 | Suzuki | H04W 76/28 370/311 |
| 2014/0321434 A1 | 10/2014 | Gayde et al. | |
| 2015/0029907 A1* | 1/2015 | Cucala Garcia | H04L 5/0073 370/278 |
| 2015/0103800 A1* | 4/2015 | Seo | H04W 48/16 370/330 |
| 2017/0093540 A1* | 3/2017 | Lei | H04L 27/2663 |

* cited by examiner

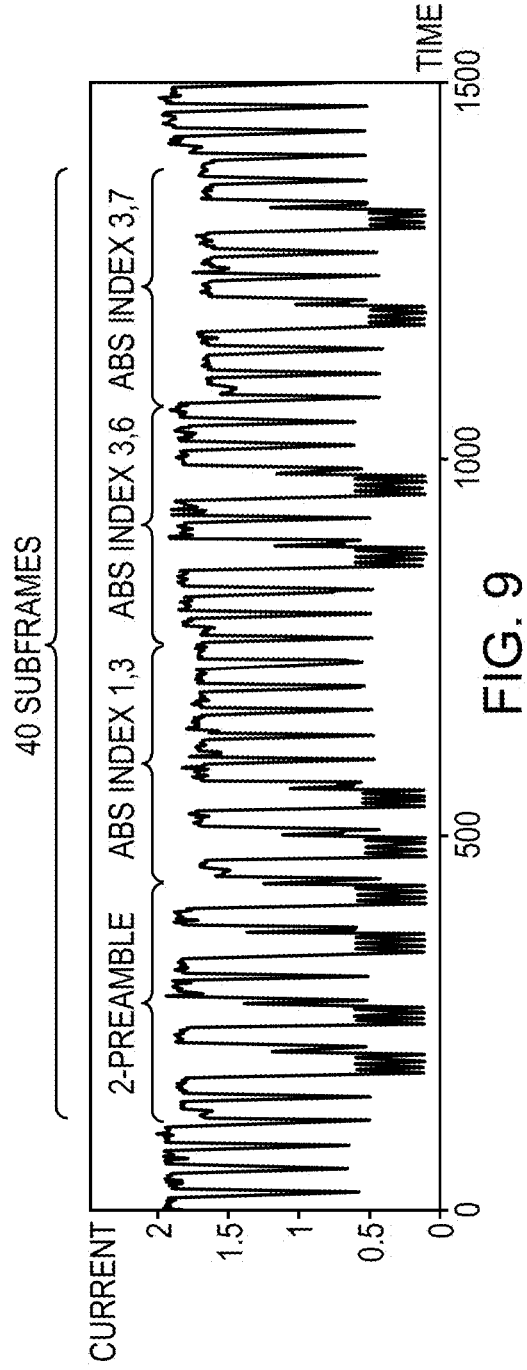
FIG. 9
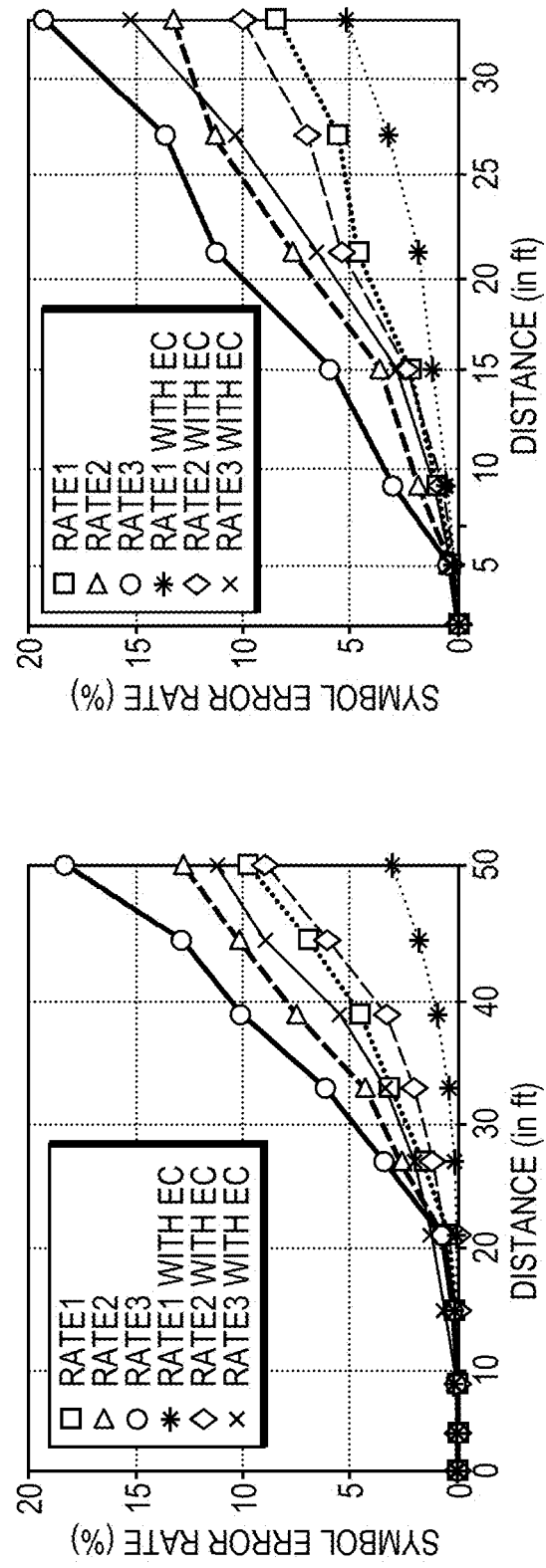
FIG. 10A
FIG. 10B

ENCODING AND DECODING DATA IN COMMUNICATION FRAMES OF A COMMUNICATIONS PROTOCOL

RELATED APPLICATION(S)

This application is the U.S. National Stage of International Application No. PCT/US2018/057748, filed on Oct. 26, 2018, which designates the U.S., published in English, and claims the benefit of U.S. Provisional Application No. 62/577,509, filed on Oct. 26, 2017. The entire teachings of the above applications are incorporated herein by reference.

GOVERNMENT SUPPORT

This invention was made with government support under Grant No. 1452628 from the National Science Foundation. The government has certain rights in the invention.

BACKGROUND

The Internet of Things (IoT) and connected things revolution is rapidly altering the vision of collecting and analyzing real-time data to optimize applications and services related to transportation, environmental monitoring, security, and others. The IoT paradigm relies on an ability to deploy sensors and other devices at scale, in the order of thousands of devices spread across a city, and communicate, only when needed, with those devices in a coordinated and efficient manner to control their operations, retrieve data of interest, and/or preform other functions. These considerations suggest that a mechanism of transmitting signals that enables efficient energy consumption would be useful.

SUMMARY

Currently, there is no solution for supporting efficient city-scale Internet of Things (IoT) control operations that also allows fine-grained signaling, in part due to evolving standards, compatibility issues arising from heterogeneous sensors and radio platforms, and licensing dedicated spectra. Furthermore, the cost of building and maintaining an IoT control infrastructure can be prohibitive. A need exists for an energy efficient IoT communication method that can be deployed on a city-wide scale that can utilize existing infrastructure and that has an ability to target individual sensors or devices.

The apparatus, systems, and methods disclosed herein provide such a solution. One example embodiment is a decoder that includes an energy detector and a processor. The energy detector is configured to detect average subframe energy levels of a plurality of subframes during reception of at least one frame of data defined by a first communications protocol (e.g., Long-Term Evolution (LTE)). The average subframe energy levels of the plurality of subframes form a pattern of relatively higher and lower energy levels. The processor is configured to interpret, according to a second communications protocol, the pattern of energy levels to decode a block of data represented by the pattern of energy levels. The energy detector can, in some embodiments, include an RF energy harvester circuit configured to operate in the frequency band of 700 MHz.

In one embodiment, passive electrical elements compose the decoder. In an alternative embodiment, a combination of passive and active electrical elements compose the decoder.

Another example embodiment is a method of decoding data within frames defined by a first communications protocol (e.g., LTE). The example method includes detecting average subframe energy levels of a plurality of subframes during reception of at least one frame, where the average subframe energy levels of the plurality of subframes form a pattern of relatively higher and lower energy levels. The method further includes interpreting, according to a second communications protocol, the pattern of energy levels to decode a block of data represented by the pattern of energy levels.

The average subframe energy levels can be detected in time relative to a synchronization indicator associated with a frame or respective synchronization indicators associated with the frame and a successive frame, and the pattern of energy levels can be defined by a time sequence of average energy levels relative in time to a synchronization indicator associated with the frame or respective synchronization indicators associated with the frame and a successive frame. The average energy during passage of a subframe with cellular data is higher than during passage of a subframe without cellular data.

The second communications protocol can be actively adapted to accommodate a change in a number of the subframes having relatively lower energy levels.

Error detection and correction can be performed on the pattern of energy levels.

Average subframe energy levels of a plurality of subframes can be detected during reception of multiple frames. In such an embodiment, a pattern of energy levels in a subsequent frame of the multiple frames can be interpreted based on a pattern of energy levels in a preceding frame of the multiple frames.

An Internet of Things (IoT) device can be configured to respond to a command within the block of data. The IoT device can be configured to remain in an energy conserving state until receiving a wake-up command within the block of data. The IoT device can be further configured to respond to the command within the block of data only if the block of data includes an identification indicator matching a unique identification indicator of the IoT device.

Another example embodiment is a method of transmitting data. The example method includes generating a communications frame, in accordance with a first communications protocol (e.g., LTE), where the frame includes (i) a synchronization indicator, (ii) a first representation of data contained within at least one given subframe that, during transmission of the frame, has a subframe average energy, and (iii) at least one other subframe that, during transmission of the frame, has a subframe average energy less than the subframe average energy of the at least one given subframe. The method further includes positioning the at least one given subframe at least one temporal location within the frame relative to the synchronization indicator to create a pattern of energy levels during the transmission of the frame to be interpreted, according to a second communications protocol, as a second representation of data. The method further includes transmitting the frame that includes the first and second representations of data.

Multiple frames can be generated that include respective representations of data according to the first and second communications protocols. In such embodiments, a subsequent frame of the multiple frames can include a representation of data, according to the second communications protocol, that is interpreted based on a representation of data, according to the second communications protocol, included in a preceding frame.

The second communications protocol can be actively adapted to accommodate a change in a number of the subframes having a subframe average energy less than the subframe average energy of the given subframe.

The second representation of data can include an error detection and correction mechanism.

The second representation of data can include a command to induce a response in an IoT device. In such an embodiment, the command can be a wake-up command to cause the IoT device to transition from an energy conserving state. The second representation of data can further include an identification indicator, and the command can induce a response in the IoT device if the identification indicator matches a unique identification indicator of the IoT device.

BRIEF DESCRIPTION OF THE DRAWINGS

In the following detailed description, reference is made to the accompanying drawings, which form a part hereof. The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 9 depicts collected raw samples of output current from a voltage rectifier showing variation in accordance with the absence or presence of Almost Blank Subframes (ABSs) within an LTE frame, according to an example embodiment.

FIGS. 10A and 10B are graphs illustrating Symbol Error Rate (SER) over a range of distances for a set of outdoor receiver scenario experiments and for indoor receiver scenario experiments.

DETAILED DESCRIPTION

A description of example embodiments follows.

The apparatus and methods disclosed herein can be used to provide an energy efficient Internet of Things (IoT) communications method that can be deployed on a city-wide scale using existing infrastructure and that can target individual sensors or devices.

One example embodiment includes a city-scale communications method and system for broadcasting control signals to IoT devices by encoding information within communications signals using established telecommunications standards and protocols, such as Long-Term Evolution (LTE), without any hardware modifications to existing cellular infrastructure. Subframes with lower average energy, such as Almost Blank Subframes (ABS), can be positioned within a frame of a signal governed by an existing communications protocol, such as LTE, to produce an energy pattern over time that represents encoded information. IoT devices, such as sensors, Internet of Things (IoT) (also referred to as connected things) enabled appliances, and/or mobile/wearable equipment may detect the information within the signal, governed by established telecommunications standards and protocols, and respond to the control signal(s) included in the primary communications signals.

Additionally, the IoT devices, such as sensors, Internet of Things (IoT) enabled appliances, and/or mobile/wearable equipment may harvest the energy of the signals using established telecommunications standards and protocols to conserve energy. In one embedment, the IoT device can include a sensor that has an adaptive decoder and an RF energy harvester circuit with high sensitivity. The RF energy harvester may be a circuit that is designed to operate in the LTE frequency band of 700 MHz with high sensitivity to the changing energy levels within the LTE, or comparable protocol, subframes. An error detection and correction mechanism may be included to counter channel and fading errors.

Embodiments are compatible with any number of low energy subframes settings chosen by the existing signal operator, and can adjust the encoding of information based on the low energy subframes' settings to achieve high transmission rates. An embodiment may further include a session management protocol used to maintain contextual information of the overlaid signal. The session management protocol can allow encoding of information across a span of multiple frames (e.g., sequential frames or every other frame), or when the existing protocol operator temporarily reduces the number of low energy subframes.

Figure 1:
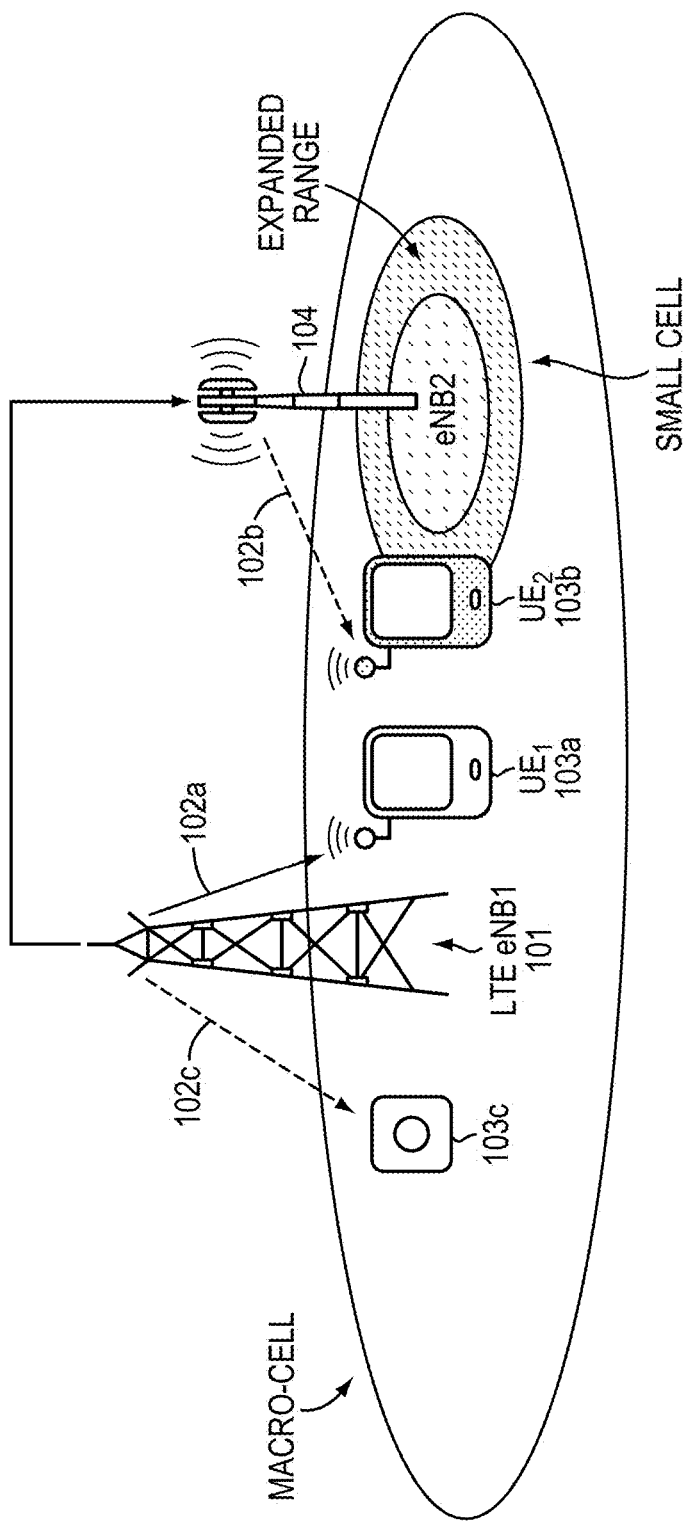
FIG. 1. is a diagram of an embodiment using existing Long-Term Evolution (LTE) network infrastructure.

FIG. 1 is a diagram of an embodiment using existing Long-Term Evolution (LTE) network infrastructure. Station 101 is an evolved NodeBs (eNBs) that manages and transmits a large range signal 102a, governed by the LTE protocol to device 103a. Station 104 is an evolved NodeBs (eNBs) that manages and transmits a short-range signal 102b to device 103b. In LTE Release 10 onwards, Almost Blank Subframes (ABSs) have been incorporated into LTE signals 102a, where certain subframes do not carry data. Station 101 communicates the ABS pattern to Station 104 allowing signal 102b to utilize the gaps in signal 102a to facilitate interference-free operation. ABSs have a lower average energy level than subframes that carry data. Information can be conveyed by positioning the ABSs within a standard LTE frame to create a pattern of energy that represents encoded data; this process is defined herein as index modulation. Index modulation using ABS (almost blank subframe index modulation or "AIM") may refer to changing the spatial positioning of the ABS within a standard LTE frame to encode data including an additional overlaid signal over LTE data signals. However, index modulation can also be used to overlay data on other communications protocols that define a frame that includes subframes of different energy levels. In an example embodiment, the information can be encoded by positioning the ABSs within a set of 40 subframes. The encoded data represented by the pattern of energy is overlaid on signal 102a. Therefore, overlaid signal 102c, containing the encoded data, is also broadcasted from station 101. IoT device 103c can detect overlaid signal 102c by monitoring the average energy levels of signal 102a. Overlaid signal 102c can be broadcasted on a city-wide scale using existing infrastructure stations 101 and 104 without interfering with broadcasted signal 102a.

Figure 2:
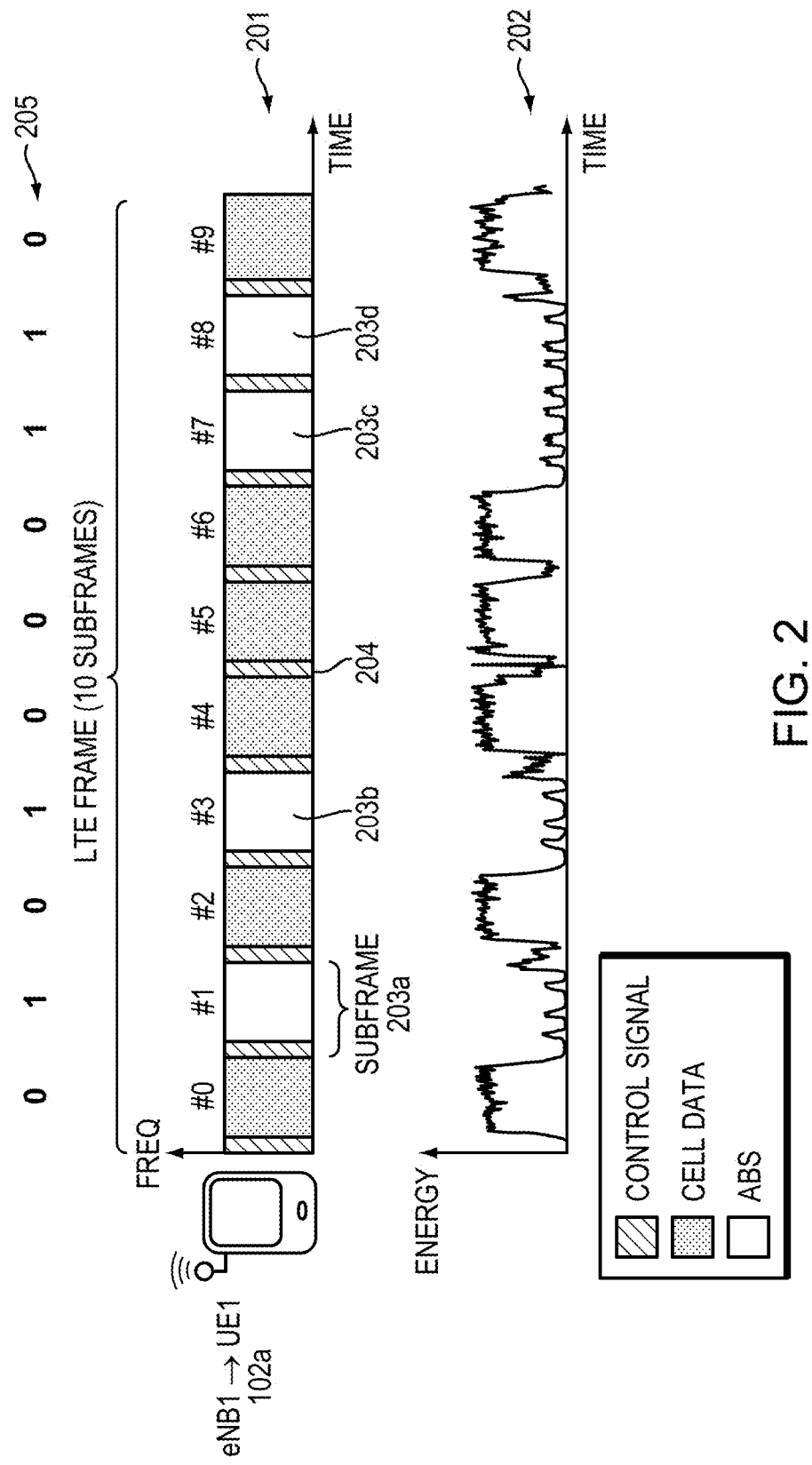
FIG. 2 illustrates a relationship between energy level and components of an LTE signal.

FIG. 2 illustrates a relationship between energy level and components of an LTE signal. A typical LTE frame has an overall length of 10 milliseconds, which is divided into twenty slots. According to current standards, an LTE subframe includes two slots; thus, there are ten LTE subframes within a typical LTE frame. LTE signal 102a includes a frame containing ten subframes (labeled #0-#9) separated by control signals (e.g., control signal 204). The subframes can be cell data subframes or ABSs 203a-d. Signal 102a also includes at least one synchronization indicator used to identify the start of the frame. Graph 201 illustrates the placement of these components over time during the transmission of a frame. Graph 202 illustrates the energy level of LTE signal 102a over time during the transmission of a frame. As shown by graph 202, the average energy of cell data subframes and ABSs 203a-d are significantly different. The energy level pattern during transmission of a frame can be converted into binary bits 205 where high energy subframes can be represented as '0' and low energy subframes can be represented as '1'. Alternatively, high energy subframes can be represented as '1' and low energy subframes can be represented as '0'. The binary bits 205 indicates the location of the high and low energy subframes, and the location of the low energy subframes can represent specific output bits. For example, the location of ABSs 203a-d at positions 1, 3, 7 and 8 of the frame of LTE signal 102a can be represented by '0101000110'. The relationship between output binary data and the position of ABS can be defined by an index. Binary data can be determined for any number of frames (or subframes) of signal 102a.

The relationship between the positions of the subframes in signal 102a, as shown in graph 201, and the energy level of signal 102a, as shown in graph 202, allows for an energy level pattern, representing binary data 205, to be created by the position of the subframes. The sequence of '1' and '0' composing binary data 205 can be altered by changing the position of subframes 203 within the frame of 102a. Therefore, the position of subframes 203 can define a new communications protocol, where the pattern of energy represents binary data 205.

Cell data is contained in cell data subframes of the LTE signal 102a and includes information that is not related to the positioning of any subframe. Therefore, the subframes within the frame, or even multiple frames, of the LTE signal 102a can be arranged in any desired position to create an energy pattern that is converted into binary data 205, effectively creating an overlaid signal 102c transmitting binary data 205 within LTE signal 102a without interfering with the transmission of signal 102a. This overlaid signal 102c, transmitting binary data 205 represented by energy patterns created by the position of the subframes, is "piggybacked" on signal 102a and is transmitted using the same infrastructure and on the same scale as signal 102a. This method of piggybacking overlaid signal 102c onto an existing signal 102a is not limited to LTE protocols. This can be accomplished with any signal that is governed by a protocol that defines a frame that contains subframes of varying energy level.

Figure 3:
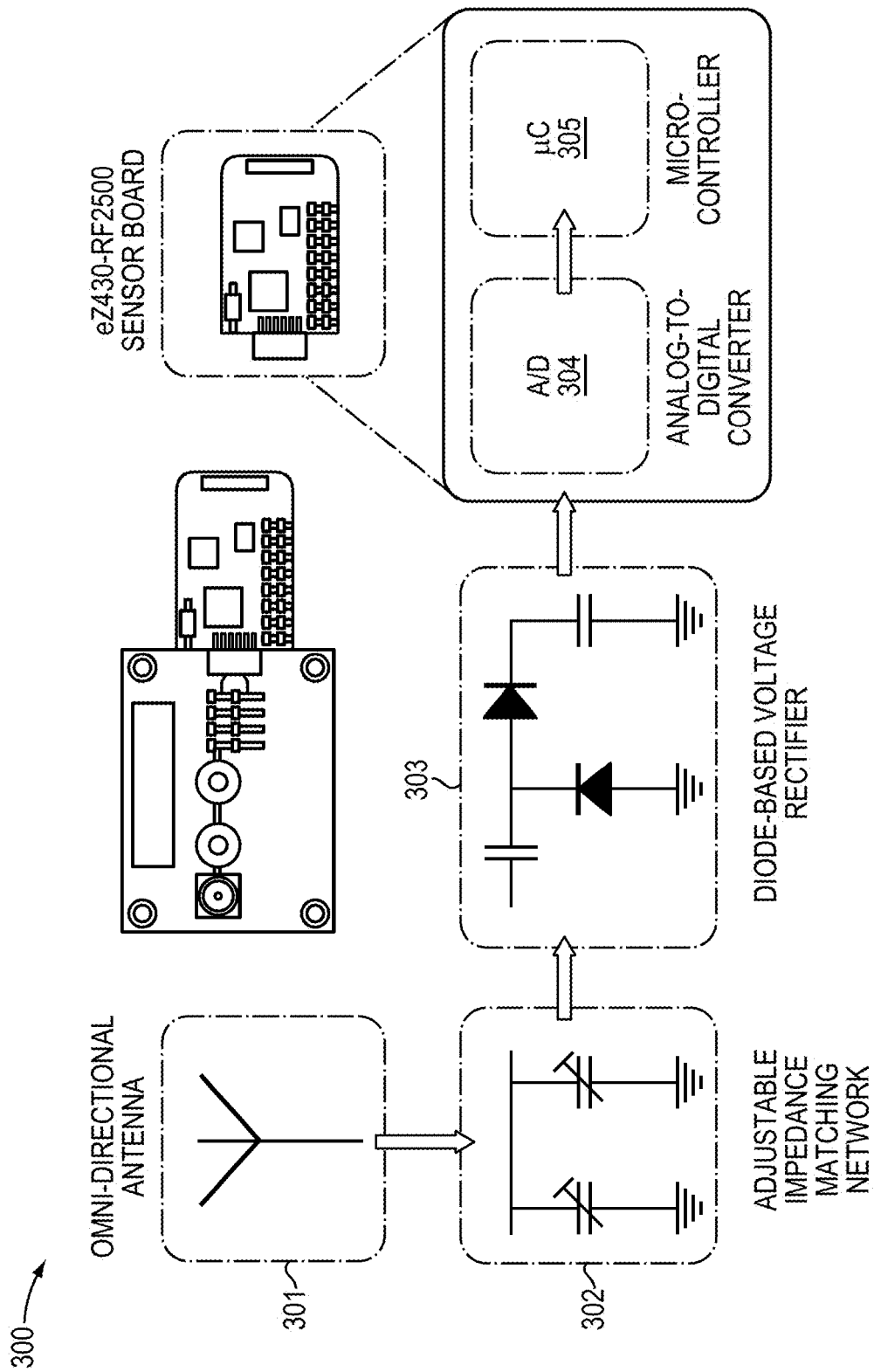
FIG. 3 is a circuit schematic for an Internet of Things (IoT) energy sensor used to detect an energy pattern of a wireless signal, such as an LTE signal, according to an example embodiment.

FIG. 3 is a circuit schematic for an Internet of Things (IoT) energy sensor used to detect an energy pattern of a wireless signal, such as an LTE signal, according to an example embodiment. Signal 102a induces a direct current, with magnitude corresponding to the energy level of signal 102a, in an omni-direction antenna 301 of circuit 300. The induced current is manipulated by an adjustable impedance matching network 302 and a diode-based voltage rectifier 303 into the output current. The example adjustable impedance matching network 302 allows tuning the harvester at the center frequency of a desired LTE cellular signal with bandwidth up to 2 MHz. The example diode-based voltage rectifier 303 removes the carrier frequency from the received LTE signal and converts the incident power into electrical current. It uses a 4-stage Dickson voltage rectifier, in which each stage consists of a HSMS-285C Schottky diode and two stage capacitors. The stage capacitor does not impact the output current level of rectifier. The stage capacitor helps to prevent ripple on the output DC electrical current. Table 1, below, presents the responsive time and smoothness of output voltage of the energy harvesting circuit for capacitor values between 1 pF to 100 pF, and input RF power −28.8 dBm.

TABLE 1

Effect of stage capacitor value

| The value of stage capacitor | Output voltage of RF-EH | Responsive time |
|---|---|---|
| 1 pF | 95 mV | 0.952 µs |
| 2.2 pF | 95 mV | 2.052 µs |
| 4.7 pF | 95 mV | 3.994 µs |
| 6.8 pF | 95 mV | 6.556 µs |
| 47 pF | 95 mV | 40.88 µs |
| 100 pF | 95 mV | 82.55 µs |

Circuit 300 may also be configured to harvest the energy of signal 102a and use the induced current to power itself, allowing for extreme energy efficiency or complete self-sufficiency. Circuit 300 may create the output current and perform energy harvesting using a RF energy harvester circuit that is designed to operate in the LTE frequency band of 700 MHz with high sensitivity to the changing signal patterns within the LTE subframes. Analog-to-digital converter 304 then converts the output current into digital data in the manner illustrated in FIG. 2. Micro-controller 305 then interprets the digital data created by analog-to-digital converter 304 into commands. Micro-controller 305 can be programmed to interpret the digital data converter from the energy levels of signal 102a as overlaid control commands for any function of computing/digital devices. Alternatively, circuit 300 may not include analog-to-digital converter 304 and micro-controller 305, and instead use passive gate logic to convert the output current to binary data that represent commands.

One example of a command may be to induce a wake-up signal used to wake up an attached main radio attached to sensor circuit 300 through hardware interrupts when the energy levels of signal 102a match a pre-defined reference value. The sensor circuit 300 may be attached to an off-the-shelf sensor that remains in a default energy conserving deep sleep state, unless woken up with specific directives. This allows for only the energy efficient sensor circuit 300 to remain active until a targeted wake up signal is sent, encoded in the energy levels of a signal using index modulation. The main radio can remain off, preserving energy, until it is needed. The main radio may be any known prior art radio, ranging from ultra-low power Bluetooth Low Energy chips for proximity-based data reporting or long-range narrow-band transmission radios, such as, for example, LORA/Sigfox.

Figure 4:
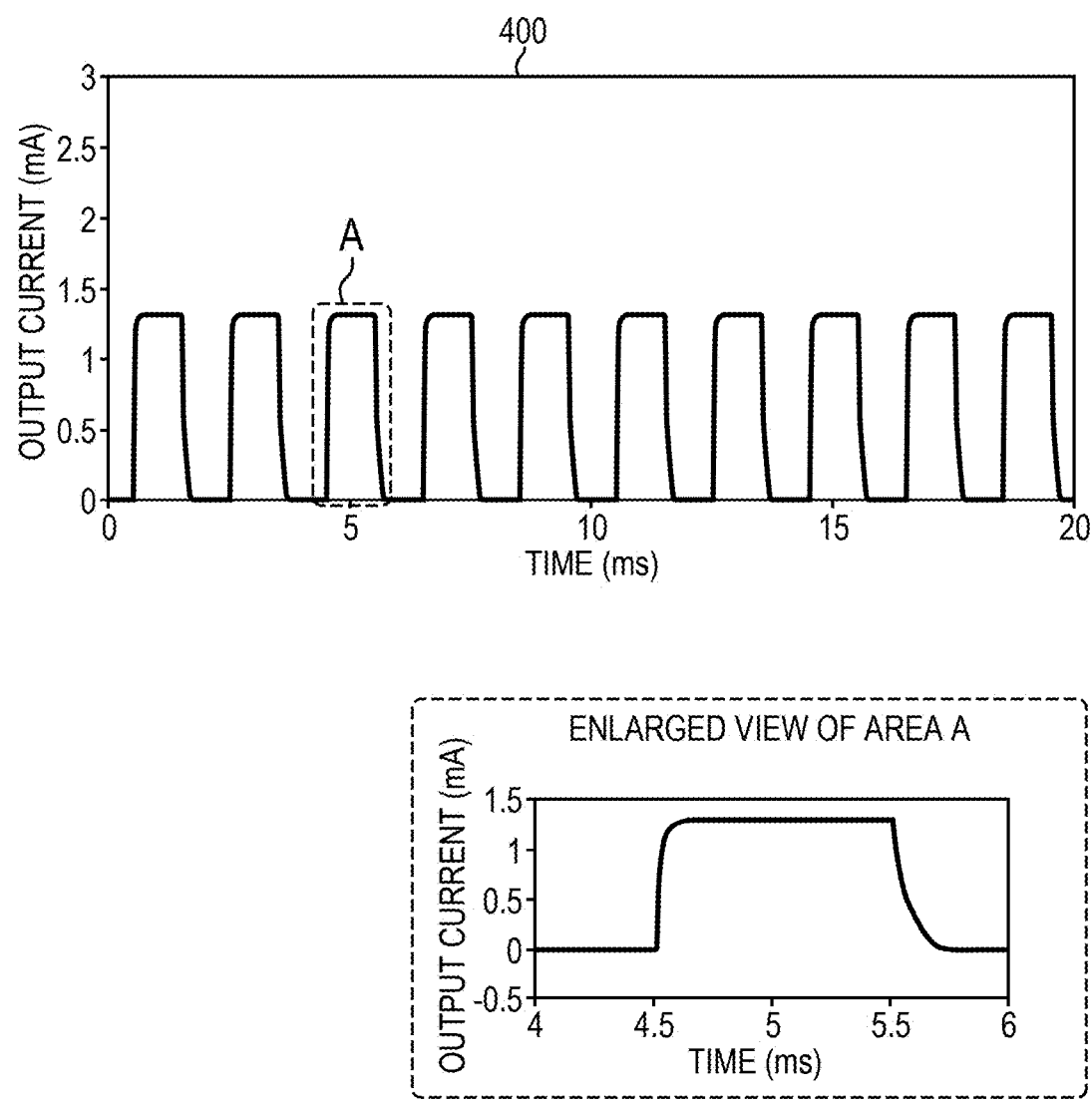
FIG. 4 is a graph illustrating output current created by the energy sensor of FIG. 3 while detecting energy of a signal transmitted by an RF source in alternate 1-millisecond periods using ON-OFF keying (OOK) modulation.

FIG. 4 is a graph illustrating output current created by the energy sensor of FIG. 3 while detecting energy of a signal transmitted by an RF source in alternate 1-millisecond periods using ON-OFF keying (OOK) modulation. Circuit 300 must have high enough sensitivity and fast enough responsiveness to detect the alteration of energy levels that occurs during the transmission of a frame in existing protocols such as LTE. Circuit 300 must respond in a time widow of approximately 1 millisecond, which corresponds to the transmission of a single subframe. Furthermore, circuit 300 must be sensitive enough to register the difference between a "high" energy subframe representing a '0', for example, containing cell data and a "low" energy subframe such as an ABS representing a '1', for example. Graph 400 illustrates that circuit 300 has the required sensitive and responsiveness to detect and decode information that is represented by the pattern of energy created by the positioning of the subframes within an LTE frame.

Figure 5:
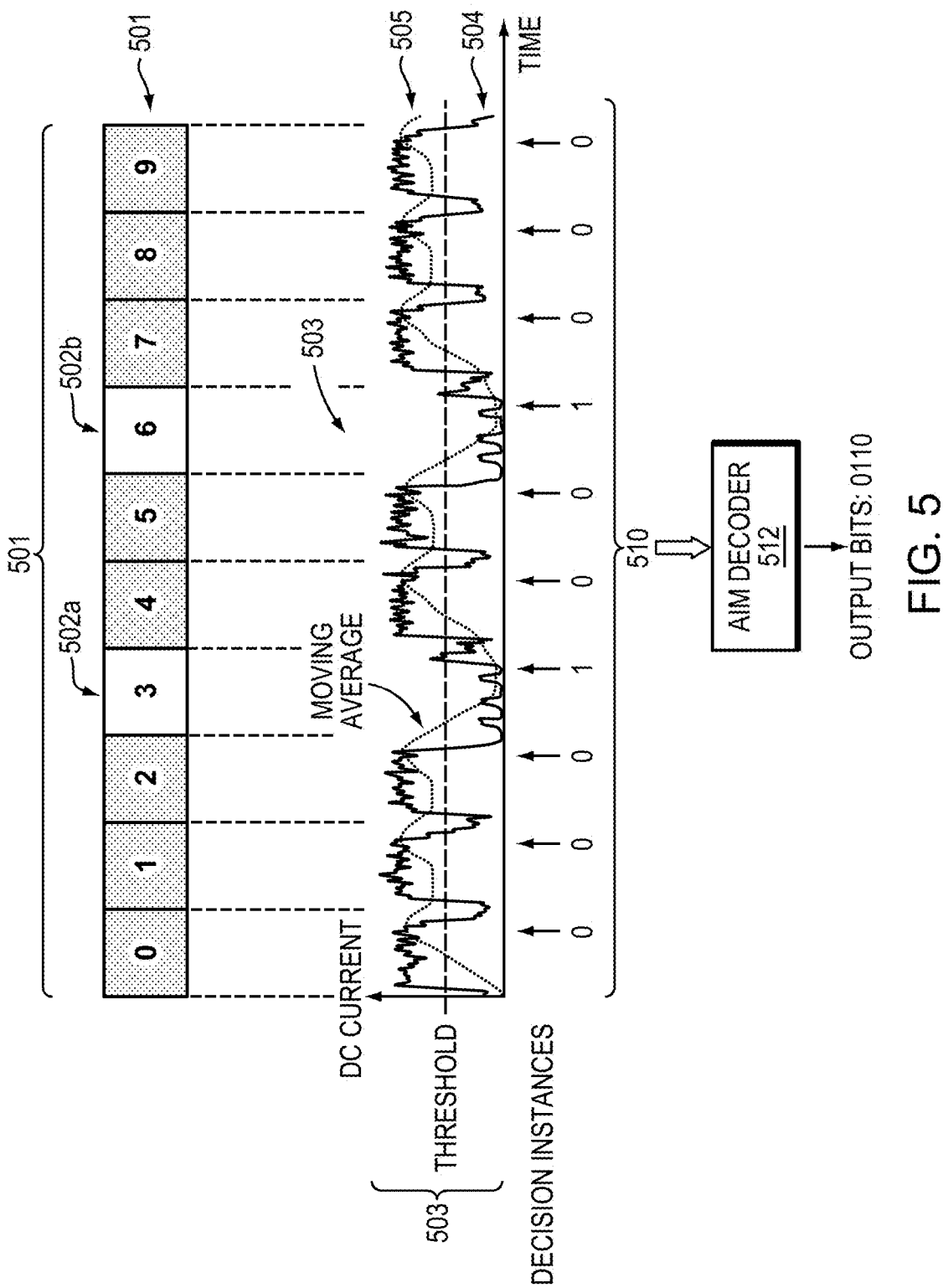
FIG. 5 illustrates output current of the energy sensor of FIG. 3 and how the output current is used to determine the locations of low energy subframes, according to an example embodiment.

FIG. 5 illustrates output current of the energy sensor of FIG. 3 and how the output current is used to determine the locations of low energy subframes, according to an example embodiment. Frame 501 is a sequence of ten subframes (labeled 0-9), including two low energy subframes 502a and 502b, for example ABSs. Referring to FIG. 1, frame 501 can be part of signal 102a transmitted by station 101 and is governed by an existing communications protocol, such as LTE. Returning to FIG. 5, graph 503 represents the output current 504 created by a sensor detecting and harvesting the energy from signal 102a containing frame 501. Output current 504 includes noise and channel-induced signal fluctuations. To overcome the effect of noise and channel-induced signal fluctuations in the output current, a moving average 505 over the width of a subframe is calculated. To determine the presence of a high or low energy subframe the moving average 505 may be compared to a threshold value at a reference sampling instance.

It may be necessary to find references points to compare the moving average to the threshold value. In order to find these reference points, in some embodiments, the receiver finds dominant peaks across the moving average output. Once the peak is detected, the corresponding peak amplitude and peak location may be stored. The decision threshold may be set to half of the peak amplitude, whereas the peaks give the best sample instances (decision instances) for the decision. At these decision instances, the output of the moving average is compared with the threshold to determine the presence of a high energy subframe, for example one containing cellular data, or a low energy subframe, for example an ABS. The decision is stored in as binary data 510, where '0' represents presence of a high energy subframe and '1' represents presence of a low energy subframe. Applying this technique to the entirety of frame 501 produces binary data 510 that identifies the location of ABS subframes 502a and 502b at positions 3 and 6 of frame 501. The binary data 510 identifying the locations of the ABS subframes 502a, and non-ABS subframes, can then be interpreted by a decoder 512 using index modulation to obtain output bits representing commands and/or data.

Because frame 501 has uniform duration subframes, the next decision instance can be determined by introducing a fixed time delay (equal to one subframe duration). Therefore, the peak detection function can be disabled for a period of time, once the dominant peak is found. However, to update the threshold value periodically, the peak detection function may be enabled after an interval of a set number of subframes.

An example embodiment may also employ an automatic rate adaptation mechanism to readjust to station 101 and signal 102a operator's choices, while still being able to overlay data compositing signal 103c for an additional IoT network. The number of low energy subframes, such as ABS, within a frame can change depending on the needs to the signal's operator. The example embodiment may interpret binary data (e.g., 510) identifying the locations of the low energy subframes differently depending on the number of low energy subframes contained in a frame of signal 102a. Furthermore, the example embodiment may dynamically alter the interpretation of binary data 510 identifying the locations of the low energy subframe to match the number of low subframes contained in the frames of signal 102a. This approach works with any number of ABS settings chosen by the LTE eNB, and accordingly adjusts the encoding of control messages at maximum possible transmission rates.

Figure 6:
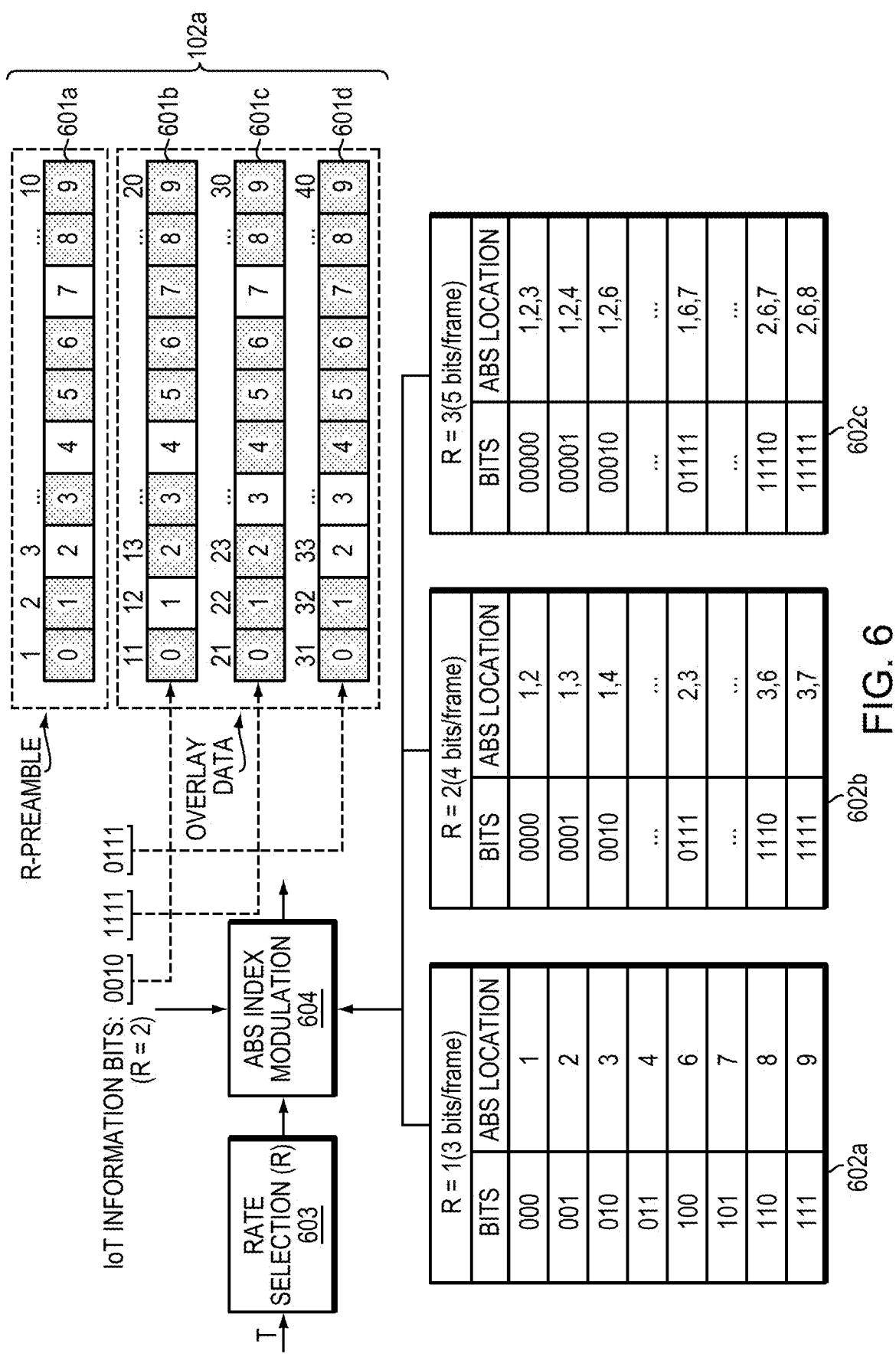
FIG. 6 illustrates the application of index modulation on an LTE signal with an automatic rate adaption mechanism, according to an example embodiment.

FIG. 6 illustrates the application of index modulation on an LTE signal with an automatic rate adaption mechanism, according to an example embodiment. In one embodiment, signal 102a is composed of four frames 601a-d, and each frame is composed of ten subframes 0-9. Each subframe can be a high energy subframe, containing cell data, or a low energy subframe, ABS. The location of the low energy subframes represents encoded data that comprises overlaid signal 102c in signal 102a. As presented above, the pattern of energy across a frame induces a current in circuit 300 that is then used to derive binary data identifying the locations of the low energy subframes within the frame. Furthermore, because the relative location of the subframes within frames 601a-d does not affect signal 102a, the subframes can be positioned in the desired locations to encode a wide range of data in overlaid signal 102c without creating any interference with signal 102a.

In an example embodiment, the first frame 601a is configured to have the locations of the low energy subframes encode information that conveys a rate-defining preamble, called the R-preamble. The R-preamble indicates the beginning of the transmission of overlaid signal 102c containing the overlaid data but also indicates the rate (R) of transmission of overlaid signal 102c. The rate indicates the number of low energy subframes, in this example the low energy subframes are ABS, in the set of four frames. The number of ABSs in the frames determines the number of bits, composing overlaid signal 102c, that can be encoded in the four frames 601a-d of signal 102a. In some embodiments, the first frame 601a is allocated four ABS to be able to represent the different types of R-preamble. The rest of the ABSs are distributed among the other three frames 601b-d, and their locations represent the overlaid data composing overlaid signal 102c. In embodiments that utilize ten subframe frames governed by the LTE protocol, the total number of possible combinations decreases for R values greater than 4. In these embodiments, R is limited to 3 or fewer.

Index modulation maps the location of low energy subframes, such as ABSs, indicated by binary data 205, to a block of bits that comprise the encoded data of overlaid signal 102c. This correlation is shown in mapping tables 602a-c. For each rate (R) a different mapping 602a, 602b, and 602c is used. Therefore, the R-preamble contained in frame 601*a* dictates how the location of the ABSs in the following three frames 601*b-d* are interpreted. Overlaid signal 102*c* is determined by first using the R-preamble in the first frame 601*a* to determine proper mapping 602*a*, 602*b*, or 602*c* based upon the number of ABSs, and then using that mapping to interpret the location of the ABSs, as indicated by binary data, in the remaining three frames 601*b-d* as three blocks of bits. The three blocks of bits combine to form the encoded data contained in overlaid signal 102*c*.

As an example, FIG. 6 shows the total number of ABSs for signal 102*a* is 10; accordingly, the rate would be selected as R=2 (four ABSs used for the R-preamble frame 601*a*, leaving two for each remaining frame 601*b-d*, and any remaining ABS that cannot be distributed to the three remaining frames is assigned to "don't care" subframes that are not sampled when measuring the average energy level). The location of the ABSs within frame 601*a* indicates that that R=2, which equates to a rate of 4 bits/frame. The mapping table for R=2, 602*b* shows that locations of ABSs at subframes 1 and 4 in frame 601*b* is mapped to bits '0010,' the location of ABS at subframes 3 and 7 in frame 601*c* is mapped to bits '1111,' and the location of ABS at subframes 2 and 3 are mapped to bits '0111.' Therefore, using the R-preamble conveyed by the ABS locations in frame 601*a*, the ABS locations for frames 601*b*-601*d* can be interpreted as encoding data '00111110111' which comprises the overlaid signal 102*c* within signal 102*a*.

In order to support rate R (603), some embodiments can employ a certain minimum number of low energy subframes, such as ABSs, and support a specific maximum number of low energy subframes. For example, when employing index modulation (604) with ABS to encoded data in a four frame LTE signal, 4 ABSs represent 1 preamble and 3 ABSs distributed in three overlay data frames. Thus, minimum of 7 ABSs and maximum 10 ABSs (i.e., 4 ABS for R preamble, 1 ABS to represent data, and 2 ABS in "don't care" subframes in each of three overlay data frames) would be supported by R=1. Table 2 summarizes the minimum number of ABSs required, maximum number of ABSs supported, useful information bits transmitted in 40 subframes, and throughput in bps for different rates for some embodiments.

TABLE 2

Summary of AIM rate-dependent settings.

| Rate | Min ABS | Max ABS | Overlaid Bits | Throughput (bps) |
|---|---|---|---|---|
| R = 1 | 7 | 10 | 9 | 225 |
| R = 2 | 10 | 16 | 12 | 300 |
| R = 3 | 13 | 19 | 15 | 375 |

Figure 7:
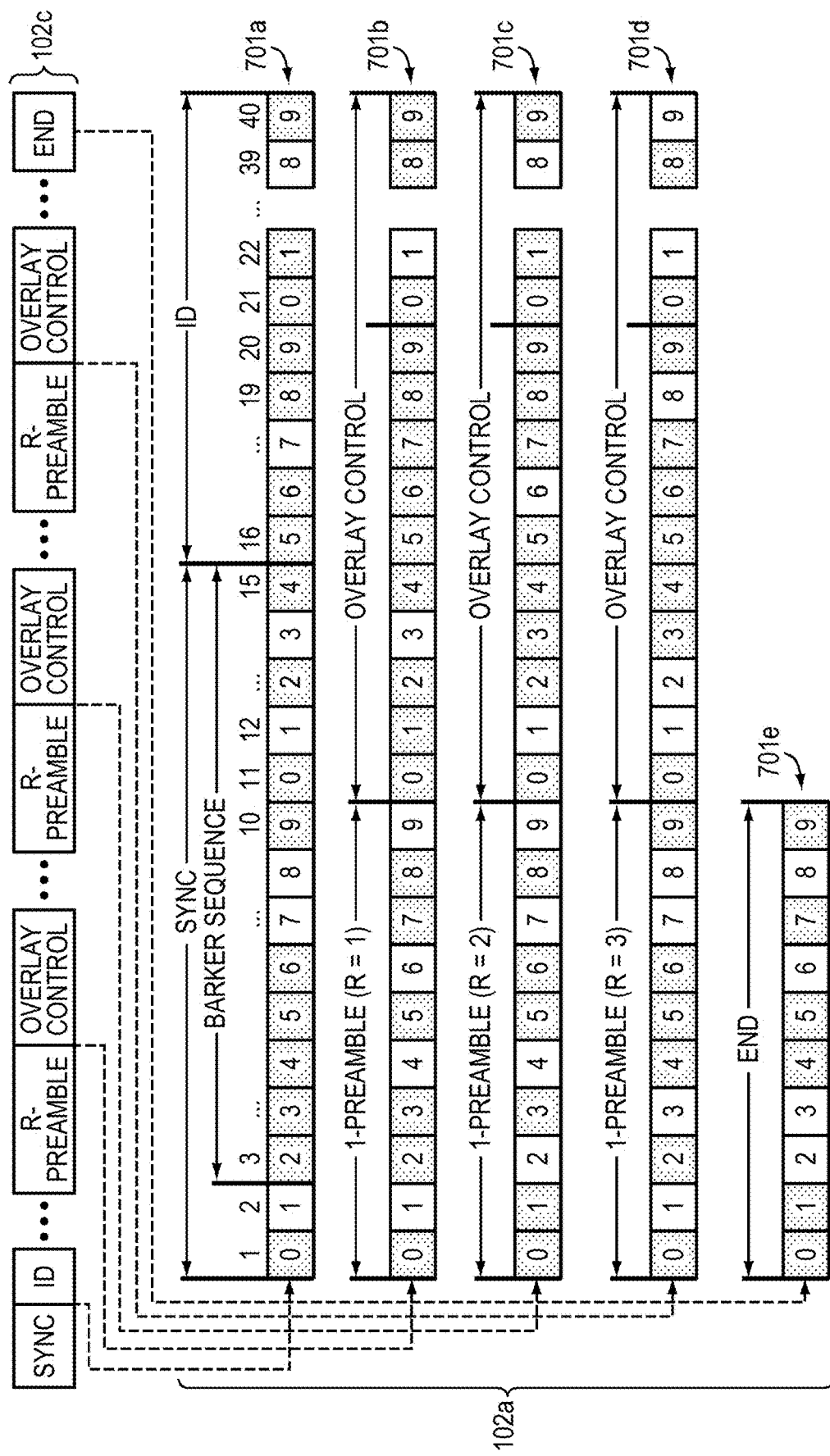
FIG. 7 illustrates an example of index modulation using session management, according to an example embodiment.

FIG. 7 illustrates an example of index modulation using session management, according to an example embodiment. In the example embodiment, signal 102*a* contains four sets of four frames 701*a-d* and an additional frame 701*e*. Each frame 701 contains ten subframes. Each subframe may be a low energy-subframe or a high-energy-subframe, and there are ten low energy subframes in each set of four frames. Data is encoded into the frames 701*a-e* using index modulation to create encoded signal 102*c*. Overlaid signal 102*c* is composed of control signals: SYNC, ID, R-Preamble, Overlay Control, and End. "SYNC" may refer to a SYNC reserve control signal in session-oriented communication management to synchronize IoT devices. "R-Preamble" may refer to a reserve control signal that indicates the beginning of a session data transmission and to inform the encoding rate R. "Overlay Control" may refer to overlaid information for the device. "End" may refer to an END reserve control signal that terminates the session for that device.

In the illustrated embodiment, for the first set of four subframes 701*a*, five low energy subframes are allocated in the first fifteen subframes to represent control signal SYNC. The remaining available low energy subframes are allocated in the subsequent twenty-five subframes representing control signal ID. Control signal ID is used to identify a specific device in the network of IoT devices configured to receive signal 102*c*. If the 0th and 5th subframes are "don't care" subframes as they are in the LTE protocol, the subsequent twenty subframes using a combination of remaining five low energy subframes can represent a unique ID corresponding to 15,504 different devices. The ID control signal is used to target the specific device it identifies in the network IoT devices. Once a device detects the SYNC, it matches the low energy pattern representing ID with the devices to the devices own unique ID. If the ID is a match, the corresponding IoT device will start the session and receive the rest of signal 102*c* contained in frames 701*b-e*. The device will terminate the session when it receives the END control signal overlaid on frame 701*e*. If the ID is not a match, the device will wait for the next SYNC command.

Session management allows for the targeting of a single device in a wide-spread network of IoT devices when overlaying signal 102*c* on a city-wide scale transmission 102*a*. Session management may maintain contextual information of the control signaling and allow unrestrained downlink data capability, spanning across multiple sets of subframes and handling possible interruptions caused by complete absence of low energy subframes or when the signal operator temporarily reduces the number of low energy subframes.

Figure 8:
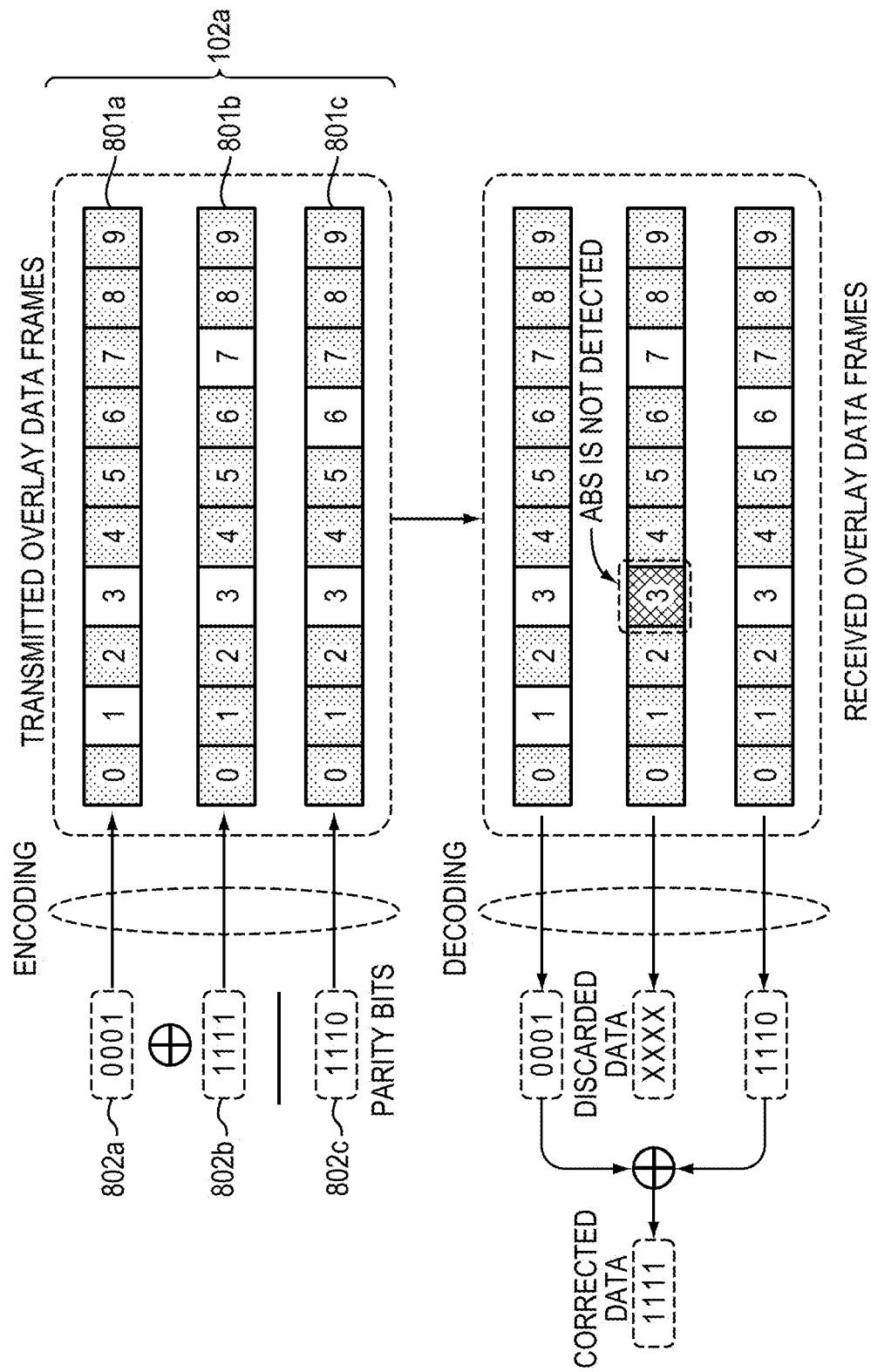
FIG. 8 illustrates a code detection and correction mechanism, according to an example embodiment.

FIG. 8 illustrates a code detection and correction mechanism, according to an example embodiment. To make the overlaid signal 102*c* reliable, a third, parity frame 801*c* can be transmitted in signal 102*a*, along with first and second frames 801*a* and 801*b* that contain the encoded data 802*a* and 802*b*. The parity frame contains encoded data 803*c* which is the result of a XOR operation on encoded data 802*a* and 802*b*. In the example illustrated in FIG. 8, the overlaid signal 102*c* is composed of eight bits of data '00011111' that is encoded in the frames 801*a* and 801*b*. The first part of overlaid signal 102*c*, 802*a*, is encoded using index modulation by placing low energy subframes at locations 1 and 3 of the first frame 801*a*. The second part of overlaid signal 102*c*, 802*b*, is encoded using index modulation by placing low energy subframes at locations 3 and 7 of the second frame 801*b*. An XOR operation is performed on '0001' and '1111', and then the resultant XORed data '1110', 802*c*, is encoded using index modulation by placing low energy subframes at locations 3 and 6 of the third frame 801*c*. At the device receiving signal 102*c*, if any of the encoded data 802*a* or 802*b* in frame 801*a* or 802*b* gets discarded due to error, the receiver can extract the corresponding encoded 802*a* or 802*b* by combining the remaining encoded data 802*a* or 802*b* with the encoded data 802*c* in the parity frame 801*c* using an XOR operation.

FIG. 9 depicts collected raw samples of output current from a voltage rectifier showing variation in accordance with the absence or presence of ABS within an LTE frame, according to an example embodiment. To collect the samples, an LTE base station (BS) was set up with USRP B210 software defined radio. The output power of the radio was set to 13 dBm. The BS transmitted standards-compliant LTE signal in the 915 MHz frequency band with bandwidth of 1.4 MHz. A MathWorks LTE System toolbox was used to generate LTE frames for different ABS pattern configurations. An IoT device used a custom-designed energy RF-EH that was connected to the TI eZ430-RF2500 sensor and was tuned to the same transmission frequency and bandwidth. The output current of the RF-EH was discretized by an analog-to-digital converter (ADC) operating at sampling frequency of 32 KHz. Two sensor deployments were studied, both indoor and outdoor, with the BS fixed at the outdoor location. The sensor-BS separation distance was increased from 2 feet to 70 feet. The ABS pattern within 40 subframes represents a R-preamble of "2", and three overlay frames each having two ABSs. The receiver established the communication by identifying the ABS pattern of SYNC, followed by ID. Once the sensor has been identified, the receiver decoded the transmitted overlaid data at the receiving rate specific R preamble.

A group of control bits were mapped to the location of the low energy subframes, ABS in this instance, within an overlay control frame, the symbol error rate (SER) was defined as the number of overlay control frames decoded incorrectly per the total number of transmitted overlay frames by the IoT device. For example, the BS may send 7500 symbols that are decoded at the receiving sensor.

FIG. 10A is a graph of the Symbol Error Rate (SER) over a range of distances for a set of outdoor experiments. Since the output current of the RF-EH is a function of received input power, the SER increased as the distance between the BS and the receiver increased. The results show less than 1% SER for the communication range up to 20 feet. In practice, an LTE base station uses transmission power of 46 dBm, and, therefore, an IoT device can achieve similar performance for much longer distances. As the rate R increases, the SER expectedly increases. This is because the probability of errors in detecting ABS increases with increase in the number of ABSs, which results in higher SER for higher rate R. The impact on SER of the error detection and correction technique ("EC"), illustrated in FIG. 8, was also analyzed. In a group of three frames, one of the two frames containing encoded data can be corrected using the parity frame. SER is much lower when error correction was used, giving less than 6% SER for a range up to 39 feet.

FIG. 10B is a graph of SER over a range of distances for a set of indoor receiver scenario experiments. An indoor receiver scenario is a challenging environment due to higher attenuation and multipath. In this case, the experiments achieved less than 6% SER up to a range of 15 feet. With error correction, this range extended to 21 feet.

FIGS. 11A-D are graphs illustrating performance in terms of throughput with and without error detection and correction techniques, according to an example embodiment. For the given experimental set-up in an outdoor scenario, the system achieved the maximum throughput for the communication range up to 21 feet. As the range increased, the throughput gradually decreased. For longer distances (63 feet and 69 feet), for example, the throughput for a lower rate R=1 or 2 may be higher than R=3 as the SER for the latter is greater than for R=1 or 2. The example embodiment supports maximum throughput of 225 bps, 300 bps, and 375 bps for rate R=1, 2, and 3 respectively.

Figure 11B:
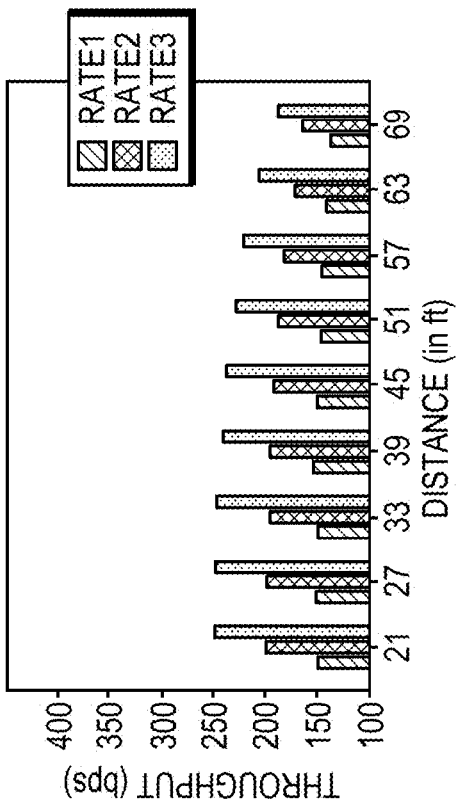
FIGS. 11A-D are graphs illustrating performance in terms of throughput with and without error detection and correction techniques, according to an example embodiment.
Figure 11D:
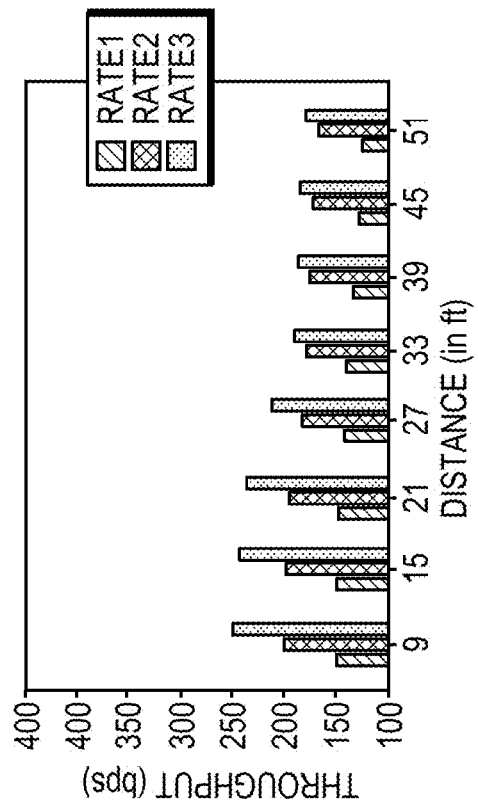
Figure 11A:
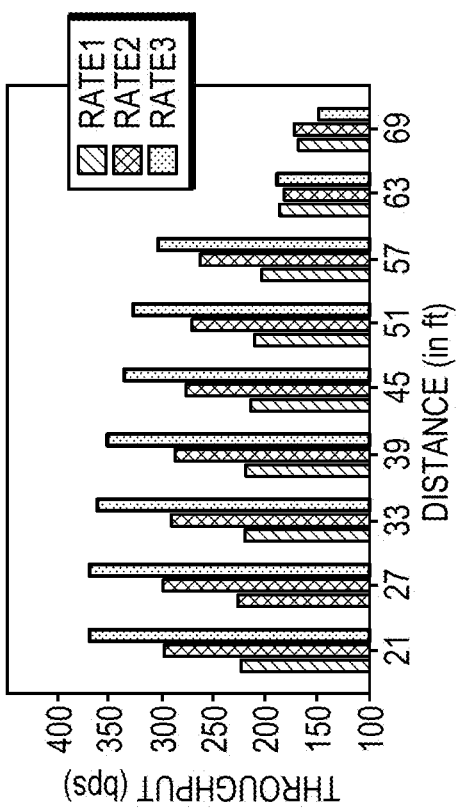
Figure 11C:
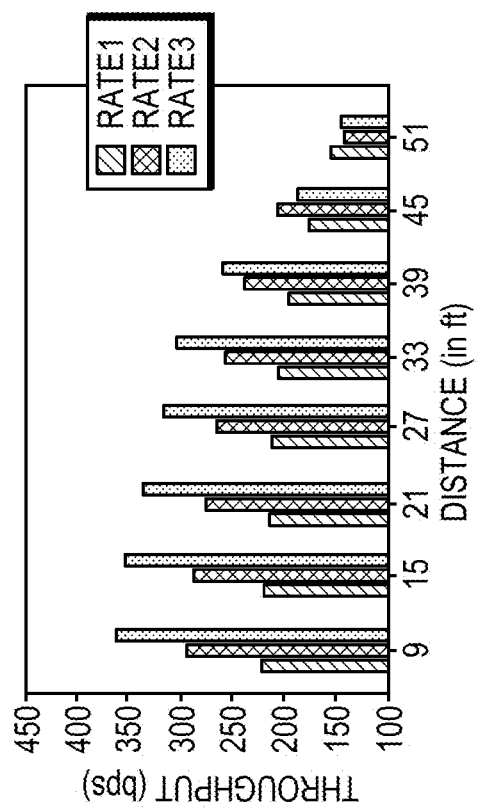

When employing the error detection and correction technique, the use of an extra frame as a parity frame incurs overhead, which reduces throughput. However, as shown in FIG. 11B for a communications range of 69 feet, it can be seen that the example IoT system achieves higher throughput with error correction than without error correction for R=3. A similar trend is observed for rates R=1 and R=2 for longer distances. FIG. 11C shows the throughput achieved by IoT for the indoor receiver scenario. It can be observed that for the given experimental set up, IoT achieves maximum throughput for communication ranges up to 9 feet. FIG. 11d shows that IoT with error correction achieves higher throughput for rate R=3 for a distance of 45 feet, whereas it achieves higher throughput for rate R=2 and R=3 for the range of 51 feet.

Figure 12B:
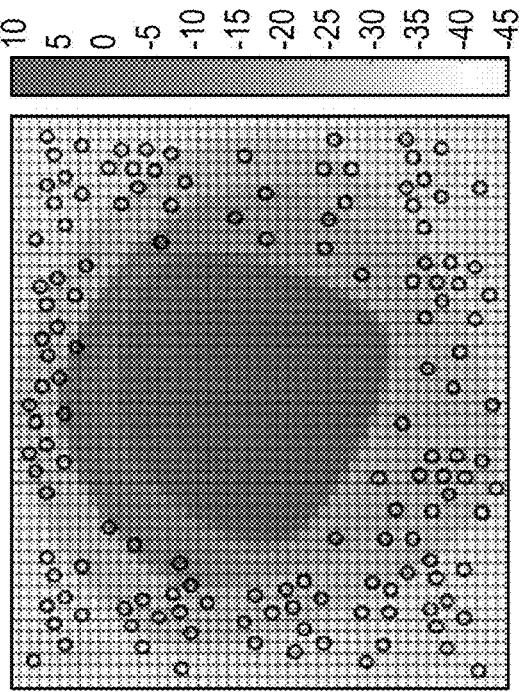
FIGS. 12A-C are heatmaps of received power distributions of three example city-scale environments, including a residential area, a stadium, and a city downtown, according to an example embodiment.
Figure 12A:
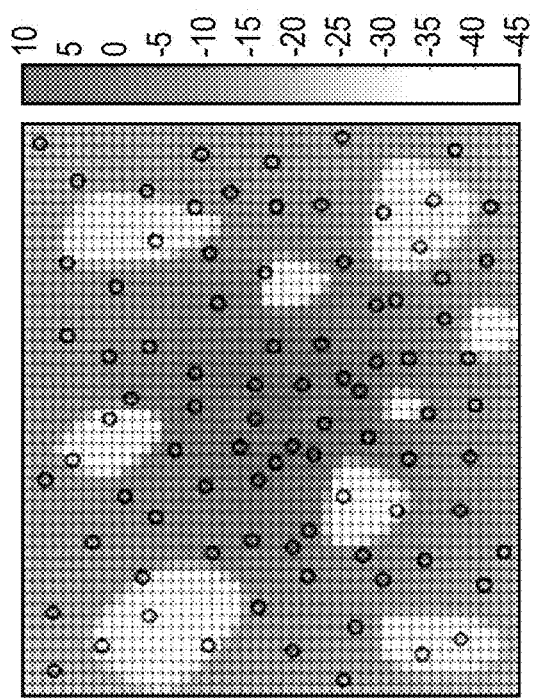
Figure 12C:
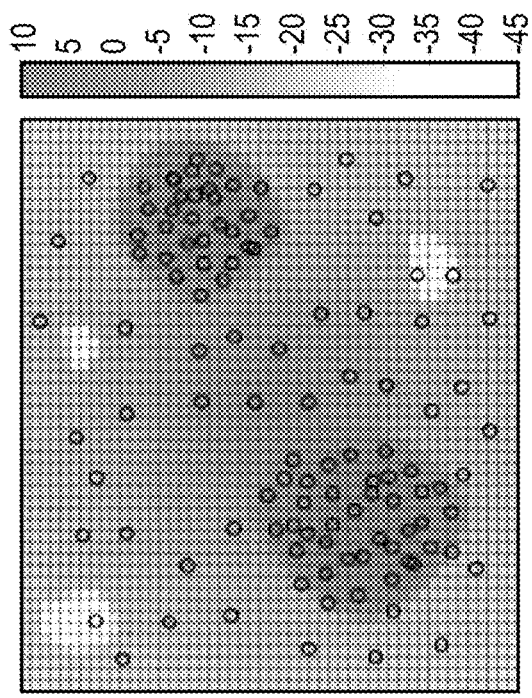

FIGS. 12A-C are heatmaps of received power distributions of three example city-scale environments, including a residential area, a stadium, and a city downtown. The residential area has uniform distribution of power. In the stadium environment, the power is concentrated inside of the stadium rather than outside (e.g., parking lots). On the other hand, the city downtown has few areas with spikes in received power and other areas with uniform distribution. The output current of each sensor is determined using its location, the harvester efficiency curves, and the corresponding input power.

Figure 13B:
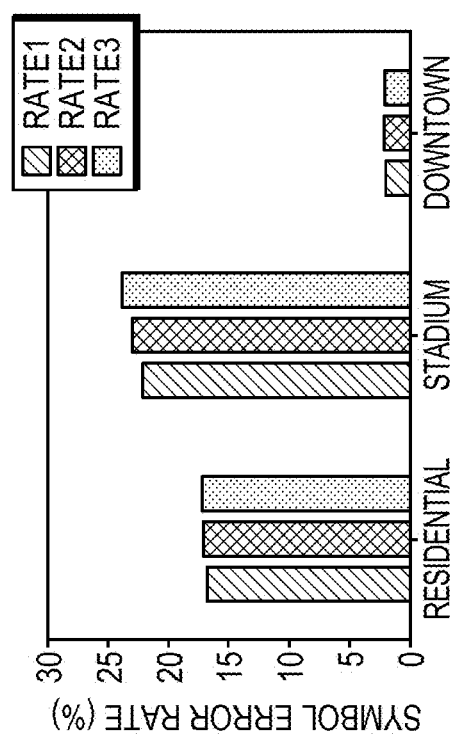
FIGS. 13A and 13B are graphs illustrating average SER and throughput of sensors for rates R=1, 2, and 3 and in different environments, according to an example embodiment.
Figure 13A:
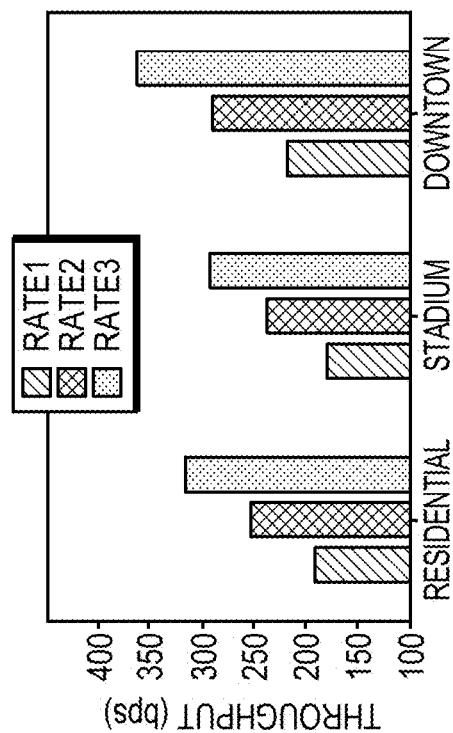

FIG. 13A is a graph illustrating average SER of sensors for rate R=1, 2, and 3 in different environments, according to an example embodiment. It can be observed that the SER is much higher for the sensors located in an added test conducted in a stadium environment, which is due to the presence of a high number of sensors at locations with low input power around the stadium areas, such as parking lots. In addition, the SER is higher as the rate of transmission increases. FIG. 13B is a graph illustrating average throughput of sensors deployed in different environments, according to an example embodiment. It is evident that the average throughput of the sensors in a city downtown is comparatively much higher, since a large number of sensors are densely deployed in regions with high received input power.

The ability to encode data comprising an additional signal 102c overlaid onto a primary signal 102a governed by existing communications protocol and produced by existing infrastructure is adaptable to a wide range of embodiments. One non-limiting example is a method for overlaying city-scale control signals, which includes using index modulation to position the ABSs of an LTE signal, which allows encoding control signals by spacing ABSs within a set of subframes over an existing standards-compliant LTE eNB without any hardware modifications to existing LTE infrastructure. This example embodiment may additionally include dynamically adjusting to the number of ABSs chosen by the eNB seamlessly through automatic rate adaptation methodology and a session management protocol to maintain contextual information and handle possible interruptions caused by complete absence of ABS or any change of ABS settings.

A systems level embodiment lies in the design of the example wake-up decoding module that interfaces within sensors. This example module is composed of an adaptive decoder functional block and an RF energy harvester (RF-EH) circuit that is designed to operate in the LTE frequency band of 700 MHz with high sensitivity to the changing signal patterns within the LTE subframes. The deployed sensors could be off-the-shelf products that remain in a default energy conserving deep sleep state, unless woken up with specific directives. Sensors may have any type of on-board radio, ranging from ultra-low power Bluetooth Low Energy chips for proximity-based data reporting or long-range narrow-band transmission radios, such as, for example, LORA/Sigfox. An example embodiment poses no constraints on the sensor design, except that its on-board microcontroller accepts an external hardware interrupt to wake up the main radio.

An example embodiment may be used to efficiently communicate with IoT devices on a city-wide scale. This communication can be done by piggybacking onto existing signals, without impact on spectrum utilization and interference overhead, and with existing infrastructure, such as LTE base stations, eliminating the need for expansive and expensive infrastructure expansion. The only operational cost in such an embodiment is the cost of installing and maintaining the physical devices. The overlaid signals may be used for city-scale emergency response, smart transportation, environmental monitoring, security, factory/inventory management, and smart homes.

Some embodiments on the device side or network side may be implemented in the form of hardware, firmware, or software. In the case of software, the software may be any language capable of configuring a processor to perform operations disclosed herein. The software may be stored on a non-transitory computer-readable medium and, when loaded and executed by a processor, cause the processor to perform the operations.

While example embodiments have been particularly shown and described, it will be understood by those skilled in the art that various changes in form and details may be made therein without departing from the scope of the embodiments encompassed by the appended claims.

What is claimed is:

1. A method of transmitting data, the method comprising:
   generating a communications frame, in accordance with a first communications protocol, the frame including:
   a synchronization indicator;
   a first representation of data contained within at least one given subframe that, during transmission of the frame, has a subframe average energy; and
   at least one other subframe that, during transmission of the frame, has a subframe average energy less than the subframe average energy of the at least one given subframe;
   positioning the at least one given subframe at at least one temporal location within the frame relative to the synchronization indicator to create a pattern of energy levels during the transmission of the frame to be interpreted, according to a second communications protocol and temporal locations of relatively higher and lower energy levels, as a second representation of data; and
   transmitting the frame that includes the first representation of data and the second representation of data.

2. The method of claim 1 further comprising actively adapting the second communications protocol to accommodate a change in a number of the subframes having a subframe average energy less than the subframe average energy of the given subframe.

3. The method of claim 1 wherein the first communications protocol is Long-Term Evolution (LTE).

4. The method of claim 1 wherein the second representation of data includes a command to induce a response in an Internet of Things (IoT) device.

5. The method of claim 4 wherein the command is a wake-up command to cause the IoT device to transition from an energy conserving state.

6. The method of claim 4 wherein the second representation of data further includes an identification indicator, and wherein the command induces a response in the IoT device if the identification indicator matches a unique identification indicator of the IoT device.

7. The method of claim 1 further comprising:
   generating multiple frames that include respective representations of data according to the first and second communications protocols.

8. The method of claim 7 wherein a subsequent frame of the multiple frames includes a representation of data, according to the second communications protocol, that is interpreted based on a representation of data, according to the second communications protocol, included in a preceding frame.

9. The method of claim 1 wherein the second representation of data includes an error detection and correction mechanism.

* * * * *